(12) United States Patent
Cockerham et al.

(10) Patent No.: US 11,735,908 B2
(45) Date of Patent: Aug. 22, 2023

(54) DEPENDABLE OPEN-PHASE DETECTION IN ELECTRIC POWER DELIVERY SYSTEMS WITH INVERTER-BASED RESOURCES

(71) Applicant: Schweitzer Engineering Laboratories, Inc., Pullman, WA (US)

(72) Inventors: Brett Mitchell Cockerham, Charlotte, NC (US); Ritwik Chowdhury, Charlotte, NC (US); John C. Town, Hillsboro, OR (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 69 days.

(21) Appl. No.: 17/670,864

(22) Filed: Feb. 14, 2022

(65) Prior Publication Data
US 2022/0263310 A1 Aug. 18, 2022

Related U.S. Application Data

(60) Provisional application No. 63/149,454, filed on Feb. 15, 2021.

(51) Int. Cl.
*H02H 7/22* (2006.01)
*H02J 3/00* (2006.01)
*H02H 1/00* (2006.01)

(52) U.S. Cl.
CPC ............ *H02H 7/22* (2013.01); *H02H 1/0007* (2013.01); *H02J 3/0012* (2020.01)

(58) Field of Classification Search
CPC ........ H02H 7/22; H02H 1/0007; H02H 3/253; H02J 3/0012; H02J 3/26; H02J 3/12
See application file for complete search history.

(56) References Cited

U.S. PATENT DOCUMENTS

| | | | |
|---|---|---|---|
| 4,161,011 | A | 7/1979 | Wilkinson |
| 4,405,966 | A | 8/1983 | Cavero |
| 4,825,327 | A | 4/1989 | Alexander |
| 5,140,492 | A | 8/1992 | Schweitzer |
| 5,703,745 | A | 12/1997 | Roberts |

(Continued)

OTHER PUBLICATIONS

K. Dase, S. Harmukh, A. Chatterjee: "Detecting and Locating Broken Conductor Faults on High-Voltage Lines to Prevent Autoreclosing Onto Permanent Faults" 46th Annual Western Protective Relay Conference, Spokane, WA Oct. 22-24, 2019.

Edmund O. Schweitzer, III, Evaluation and Development of Transmission Line Fault Locating Techniques Which Use Sinusoidal Steady-State Information, 9th Annual Western Protective Relay Conference, Oct. 26-28, 1982.

(Continued)

*Primary Examiner* — Jared Fureman
*Assistant Examiner* — Nicolas Bellido
(74) *Attorney, Agent, or Firm* — Fletcher Yoder, P.C.; Richard M. Edge (57) ABSTRACT

Systems and methods are described herein to detect an open-phase condition associated with an inverter-based resource for electric power generation within an electric power delivery system. An electric power delivery system may include one or more inverter-based resources that provide three phased electric power to one or more loads of an electric utility. A controller may include circuitry to measure voltage unbalances between different phases, high voltage sequences, phase voltage waveform harmonic distortions, voltage levels, and current levels to dependably detect an open-phase condition of the electric power delivery system.

20 Claims, 6 Drawing Sheets

(56) References Cited

U.S. PATENT DOCUMENTS

| | | | |
|---|---|---|---|
| 6,028,754 | A | 2/2000 | Guzman-Casillas |
| 6,147,616 | A * | 11/2000 | Kim ........................ H02H 3/00 |
| | | | 340/645 |
| 6,721,671 | B2 | 4/2004 | Roberts |
| 7,660,088 | B2 | 2/2010 | Mooney |
| 8,410,785 | B2 | 4/2013 | Calero |
| 8,525,522 | B2 | 9/2013 | Gong |
| 8,558,551 | B2 | 10/2013 | Mynam |
| 8,736,297 | B2 | 5/2014 | Yelgin |
| 8,942,954 | B2 | 1/2015 | Gong |
| 9,257,827 | B2 | 2/2016 | Calero |
| 9,711,967 | B1 * | 7/2017 | Czarnecki ................. H02J 5/00 |
| 10,162,015 | B2 | 12/2018 | Xu |
| 10,197,614 | B2 | 2/2019 | Benmouyal |
| 10,261,567 | B2 | 4/2019 | Mynam |
| 10,436,831 | B2 | 10/2019 | Kang |
| 10,649,020 | B2 | 5/2020 | Achanta |
| 11,169,195 | B2 | 11/2021 | Naidu |
| 11,218,023 | B2 | 1/2022 | Manson |
| 11,346,878 | B2 | 5/2022 | Benmouyal |
| 2009/0150099 | A1 | 6/2009 | Balcerek |
| 2011/0264389 | A1 | 10/2011 | Mynam |
| 2012/0004867 | A1 | 1/2012 | Mousavi |
| 2014/0236502 | A1 | 8/2014 | Calero |
| 2014/0351472 | A1 | 11/2014 | Jebson |
| 2017/0003335 | A1 | 1/2017 | Kang |
| 2017/0207698 | A1 * | 7/2017 | Kuboyama ............. H02M 1/14 |
| 2017/0227611 | A1 | 8/2017 | Xu |
| 2020/0021131 | A1 * | 1/2020 | Schneider ......... H02J 13/00007 |
| 2021/0048486 | A1 * | 2/2021 | Bell ..................... G01R 31/085 |

OTHER PUBLICATIONS

Yanfeng Gong, Mangapathirao Mynam, Armando Guzman, Gabriel Benmouyal, Boris Shulim, Automated Fault Location System for Nonhomogeneous Transmission Networks, 37th Annual Western Protective Relay Conference, Oct. 19-21, 2010.

Gabriel Benmouyal, Jeff Roberts, Superimposed Quantities: Their True Nature and Application in Relays, 26th Annual Western Protective Relay Conference, Oct. 26-28, 1999.

Fernando Calero, Daqing Hou, Practical Single-Pole Line Protection Scheme Considerations, 31st Annual Western Protective Relay Conference, Oct. 19-21, 2004.

Gabriel Benmouyal, Armando Guzman, Rob Jain, Tutorial on the Impact of Network Parameters on Distance Element Resistance Coverage, 40th Annual Western Protective Relay Conference Oct. 15-17, 2013.

E.O. Schweitzer, III, Armando Guzman, Mangapathirao Mynam, Veselin Skendic, Bogdan Kasztenny, Stephen Marx, Locating Faults by the Traveling Waves They Launch, 40th Annual Western Protective Relay Conference Oct. 15-17, 2013.

Tony Jiao, Charles Henville, Evolving Transmission Line Faults While Single Phase Open, 41st Annual Western Protective Relay Conference, Oct. 13-16, 2014.

Methods for Analyzing and Detecting an Open Phase Condition of a Power Circuit to a Nuclear Plant Station Service or Startup Transformer, Power System Relaying and Control Committee Report of Working Group K11 of the Substation Protection Subcommittee, IEEE PES, Jan. 2020.

* cited by examiner

DEPENDABLE OPEN-PHASE DETECTION IN ELECTRIC POWER DELIVERY SYSTEMS WITH INVERTER-BASED RESOURCES

CROSS-REFERENCE TO RELATED APPLICATIONS

This application claims the benefit of U.S. Provisional Application No. 63/149,454, filed Feb. 15, 2021, and entitled "DEPENDABLE OPEN-PHASE DETECTION IN ELECTRIC POWER DELIVERY SYSTEMS WITH INVERTER-BASED RESOURCES," which is incorporated herein by reference in its entirety for all purposes.

BACKGROUND FIELD

The present disclosure relates generally to electric power delivery in electric power delivery systems and, more particularly, to monitoring and control systems of the electric power delivery systems using inverter-based electric power generation.

Electric power delivery systems (e.g., macrogrids) are used to transmit electric power from generators to loads. An electric power delivery system may include an inverter-based electric power generation providing three-phased electric power. Moreover, an electric power delivery system may include protective systems to facilitate transmission of electric power from generators to loads. These protective systems may disconnect the generators and the loads when detecting a fault. An open-phase condition is a series fault condition when one or two of the three phases of an electric power delivery system is open causing the three phase voltages to become unbalanced. Faults such as these may be difficult to detect in electric power delivery systems that include inverter-based resources.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Systems and methods are described herein to accommodate different settings associated with an inverter-based resource for electric power generation within an electric power delivery system. An electric power delivery system may include one or more distributed energy resources that provides electric power to one or more electric utilities, each including one or more loads. A distributed energy resource may include one or more electric power sources. An electric utility may include a number of substations and a number of loads.

In some embodiments, the distributed energy resource may include one or more inverter-based resources (hereinafter IBRs). The distributed energy resource may provide three phased electric power to downstream loads using the inverters. An inverter may produce alternating current (AC) from a direct current (DC) source (e.g., battery) for providing the electric power to the downstream components. For example, the inverter may produce three phase AC signals with a single frequency component (e.g., 60 Hertz), or multiple frequencies causing distorted voltages and currents. In some cases, the IBR may operate as a battery-energy storage system (BESS).

The distributed energy resource may provide the electric power generated by the inverter to one or more loads of the electric utility through one or more substations. That said, the distributed energy resource and the electric utility may be coupled via one or more point of common coupling (PCC) breakers. For example, a substation may include a PCC breaker. Additionally or alternatively, the electric power delivery system may include one or more PCC breakers positioned outside the substation on distribution lines coupling the distributed energy resource and the electric utility. In some cases, the distribution lines may include one or more reclosers (e.g., pole-top reclosers) operating as the PCC breakers.

In some cases, a PCC breaker may include a PCC controller. For example, the PCC controller may include one or more processors, programmable logic devices, Field Programmable Gate Arrays (FPGAs), microprocessors, a combination thereof, or any other viable processing circuitry. The PCC controller may determine one or more current factors and/or voltage factors of the inverter on the distribution lines. For example, the PCC controller may receive one or more current factors and/or voltage factors of the distribution lines from one or more sensors and/or meters of the distributed energy resource and/or the electric utility.

The electric power delivery system may include one or more transformers. For example, each transformer may adjust the voltage provided by the IBR for downstream components of the electric power delivery system. Moreover, each transformer may include multiple windings to adjust the three phase voltages of the electric power for downstream components.

In some cases, one of the three phases of the circuit may malfunction. In particular, in some cases, one of the three phases may experience an open-phase condition. For example, different components of the electric power delivery system may cause the open-phase condition (e.g., broken conductor or an open switch/breaker). In such cases, electric power delivery to the downstream components using two phases is undesirable. Accordingly, the PCC controller may provide control signals to open the PCC breaker when determining an open-phase condition of one of the three phases of the circuit. The PCC controller may determine an open-phase condition based on determining one or more current factors and/or voltage factors of the distribution lines. In different embodiments, the distributed energy resource or the electric utility may include the transformer.

In some cases, when the IBR is providing the electric power to the downstream components, the PCC controller may determine the open-phase condition based on using multiple detection schemes in tandem. For example, the PCC controller may determine a combination of one or more current factors and/or voltage factors to determine the open-phase condition. The one or more current factors and/or voltage factors may include a phase voltage, one or more sequence voltages (e.g., zero-sequence voltage, negative-sequence voltage, and positive-sequence voltage), voltage harmonics and/or a voltage total-harmonic distortion (V-THD), and/or one or more currents of the distribution lines. Subsequently, the PCC controller may provide the control signals to open the PCC breaker based on determining the open-phase condition.

Figure 1:
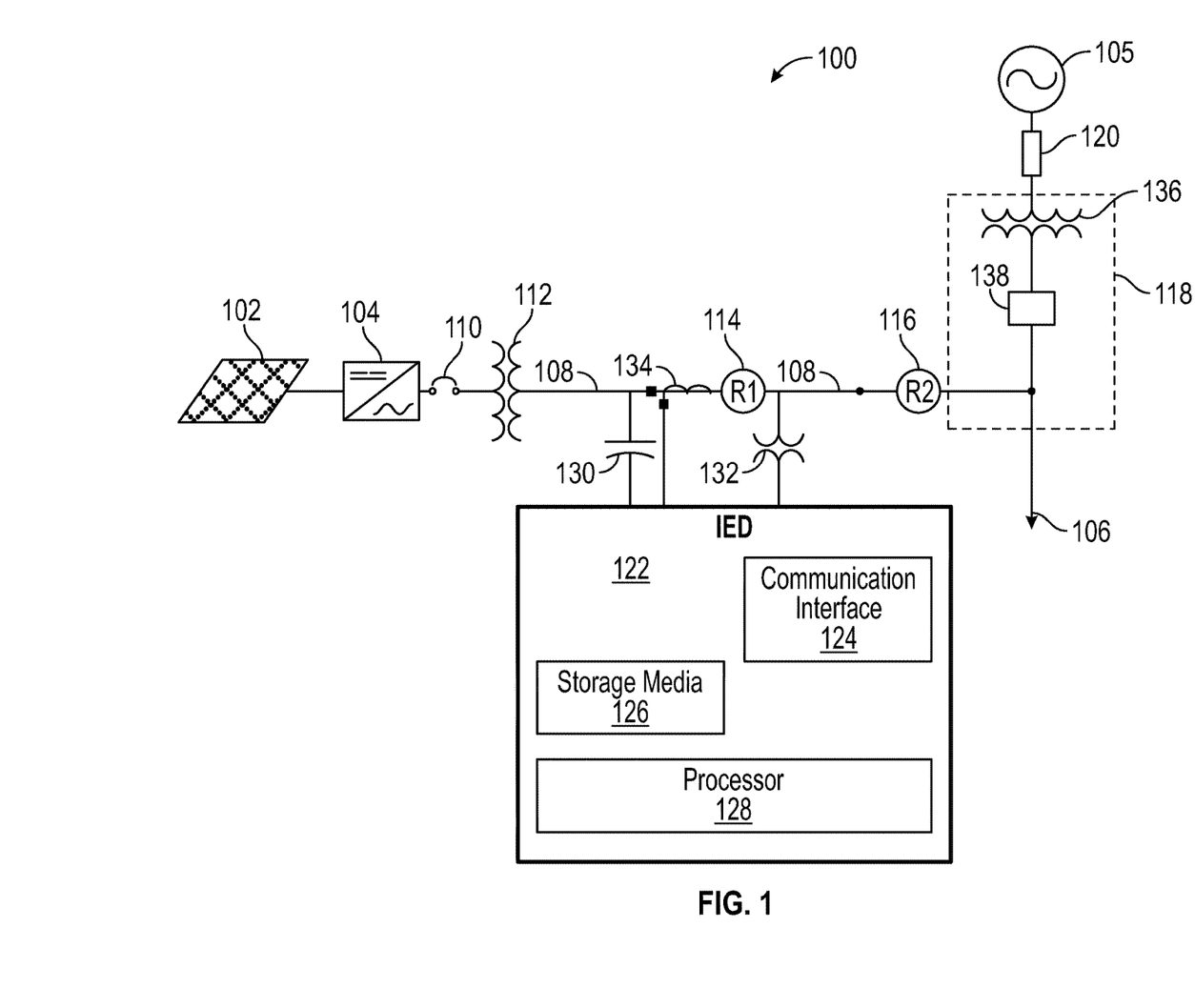
FIG. 1 depicts an inverter-based electric power delivery system including a device that incorporates dependable open-phase detection logic, in accordance with an embodiment.

With the foregoing in mind, FIG. 1 depicts an electric power delivery system 100 (e.g., a macrogrid). The electric power delivery system 100 may be an example of the electric power delivery system described above. In some cases, the electric power delivery system 100 may include a distributed energy resource providing electric power to an electric utility including one or more loads.

The electric power delivery system 100 may include an electric power resource 102 providing electric power to an IBR 104. For example, the electric power resource 102 and the IBR 104 may be or may be a part of a distributed energy resource of the electric power delivery system 100. In some cases, the electric power resource 102 may include a battery-, solar-, and/or wind-based electric power resource.

The IBR 104 may store and supply the electric power to a load 106 via a distribution line 108. A utility source 105 may also provide electric power to the load 106 via a substation 118. In the depicted embodiment, the distribution line 108 may be connected to a contactor 110, a transformer 112, a first recloser 114 (e.g., a pole-top recloser, three-phase switch), a second recloser 116, the substation 118, and a system impedance 120 (e.g., equivalent system impedance, near equivalent system impedance) for providing the three phased electric power to the load 106.

The IBR 104 may provide the electric power to the transformer 112 via the contactor 110. For example, the contactor 110 may open the connection when a current of the electric power exceeds a threshold. The transformer 112 may adjust the voltage based on a standard delivery voltage level. For example, the transformer 112 may provide the electric power to the downstream components based on a voltage ratio.

In one embodiment, the electric power resource 102, the IBR 104, the contactor 110, the transformer 112, and the first recloser 114 may be considered a distributed energy resource. Moreover, the electric utility may include the second recloser 116, the utility source 105, the substation 118, the system impedance 120, and the load 106. That said, in different embodiments, the first recloser 114 and the second recloser 116 may be disposed remotely or in proximity of each other. An Intelligent Electrical Device (IED) 122 may obtain electric power system information to determine the open-phase condition using current transformers (CTs), potential transformers (PTs), Rogowski coils, voltage dividers, sensors and/or the like.

As used herein, an IED (the IED 122) may refer to any microprocessor-based device that monitors, controls, automates, and/or protects monitored equipment (e.g., the first reclosers 114) within electric power delivery system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like.

With that in mind, the first recloser 114, the second recloser 116, or both, may be in line with a connected three phase transformer 112. Moreover, the first recloser 114, the second recloser 116, or both, may include a PCC breaker and/or a PCC controller. In some cases, the IED 122 may include the PCC controllers of the first recloser 114, the PCC controllers of the second recloser 116, or both. In alternative or additional cases, the IED 122 of the electric power delivery system 100 may provide control signals to the PCC controllers of the first recloser 114, the second recloser 116, or both. Accordingly, the IED 122 and the PCC controller may be used interchangeably hereinafter.

In some cases, one of the three phases of the transformer 112, one of the three phases of the first recloser 114, or one of the three phases of the second recloser 116 may experience an error (e.g., open-phase condition). The IED 122 may detect such open-phase conditions based on determining one or more current factors and/or voltage factors of the distribution line 108.

In the depicted embodiment, the IED 122 may monitor the one or more current factors and/or voltage factors on the distribution line 108 based on using a capacitive low-energy analog voltage sensor 130 and a current transformer 134 on one side and a potential transformer 132 on another side of the first recloser 114. In one embodiment, the current transformer 134 may include a coil for sensing the current of the three phases of the MR 104.

For example, the IED 122 may include and dependably use multiple detection schemes for determining a voltage, one or more voltage sequences (e.g., zero-sequence voltage, negative-sequence voltage, and positive-sequence voltage), voltage harmonics and/or a voltage total-harmonic distortion, and/or one or more currents of the distribution line 108 on both sides of the first recloser 114. Accordingly, the IED 122 may open the PCC breaker of the first recloser 114 based on determining the open-phase condition on either side of the first recloser 114.

The IED 122 may detect when one of the three phases of the transformer 112 or the transformer of the first recloser 114 experiences open-phase conditions on one side of the first recloser 114. Moreover, the IED 122 may detect when the transformer of the second recloser 116 experiences open-phase conditions on the other side of the first recloser 114. As such, the IED 122 monitors the electric power delivery system 100, although further IEDs may also be utilized to monitor further locations of the system.

The term IED may be used to describe an individual IED or a system comprising multiple IEDs. In the depicted embodiment, the IED 122 may include a communication interface 124, a storage media 126, and a processor 128. In alternative or additional embodiments, the IED 122 may include different elements and/or functional blocks. In some cases, the processor 128 may include a processor, a microprocessor, a programmable logic device, a combination thereof, or any other viable processing circuitry. In any case, the processor 128 may implement a monitoring and protection scheme for providing the control signals to the first recloser 114, the second recloser 116, or both.

For example, the communication interface 124 may receive an indication of the voltage and/or current of the three phases of the IBR 104 from the capacitive low-energy analog voltage sensor 130, the potential transformer 132, and the current transformer 134. That said, in alternative or additional cases, the electric power delivery system 100 may include different instrument transformers to provide an indication of the voltage and/or current of the three phases of the IBR 104 to the communication interface 124. For example, the communication interface 124 may include a front end circuitry to receive the input signals.

The processor 128 may receive one or more signals indicative of the voltage and/or current of the three phases of the IBR 104 from the communication interface 124. For example, the communication interface 124 may condition the input signals to provide the one or more signals to the processor 128. The processor 128 may monitor the voltage and/or current of the three phases of the IBR 104 based on the voltage and/or current of the three phases of the IBR 104.

In one embodiment, the processor 128 may determine whether an open-phase condition occurs based on comparing the received signals against one or more thresholds. For example, the storage media 126 may store a threshold for a voltage, one or more voltage sequences (e.g., zero-sequence voltage, negative-sequence voltage, and positive-sequence voltage), voltage harmonics and/or a voltage total-harmonic distortion, and/or one or more currents, or a combination thereof, to determine the open-phase condition of the IBR 104. The processor 128 may receive such thresholds from the storage media 126. Accordingly, the IED 122 may provide the control signals to open the first recloser 114, the second recloser 116, or both in response to determining the open-phase condition of the IBR 104.

The substation 118 may provide electric power generated by the utility source 105, the IBR 104, or both, to the load 106 coupled thereto. In particular, the substation 118 may provide the electric power to the load 106 based on an electric power demand of the load 106, the electric power generation of the IBR 104, the electric power generation of the utility source 105, or a combination thereof.

The substation 118 may include a transformer 136 to provide the electric power generated by the utility source 105 to downstream components. For example, the transformer 136 may provide a stepped-up, stepped-down, or the received voltage level of the utility source to the downstream components.

In some embodiments, the substation 118 may also include a breaker 138 between the transformer and the distribution line 108 for connecting and disconnecting the transformer 136 from the distribution line 108 (e.g., the IBR 104 and/or the load 106). In some cases, the breaker 138 may also include a controller to open the breaker 138 based on determining an open-phase condition. In alternative or additional cases, the IED 122 may provide the control signals to open the breaker 138 in response to detecting an open-phase condition.

Figure 2:
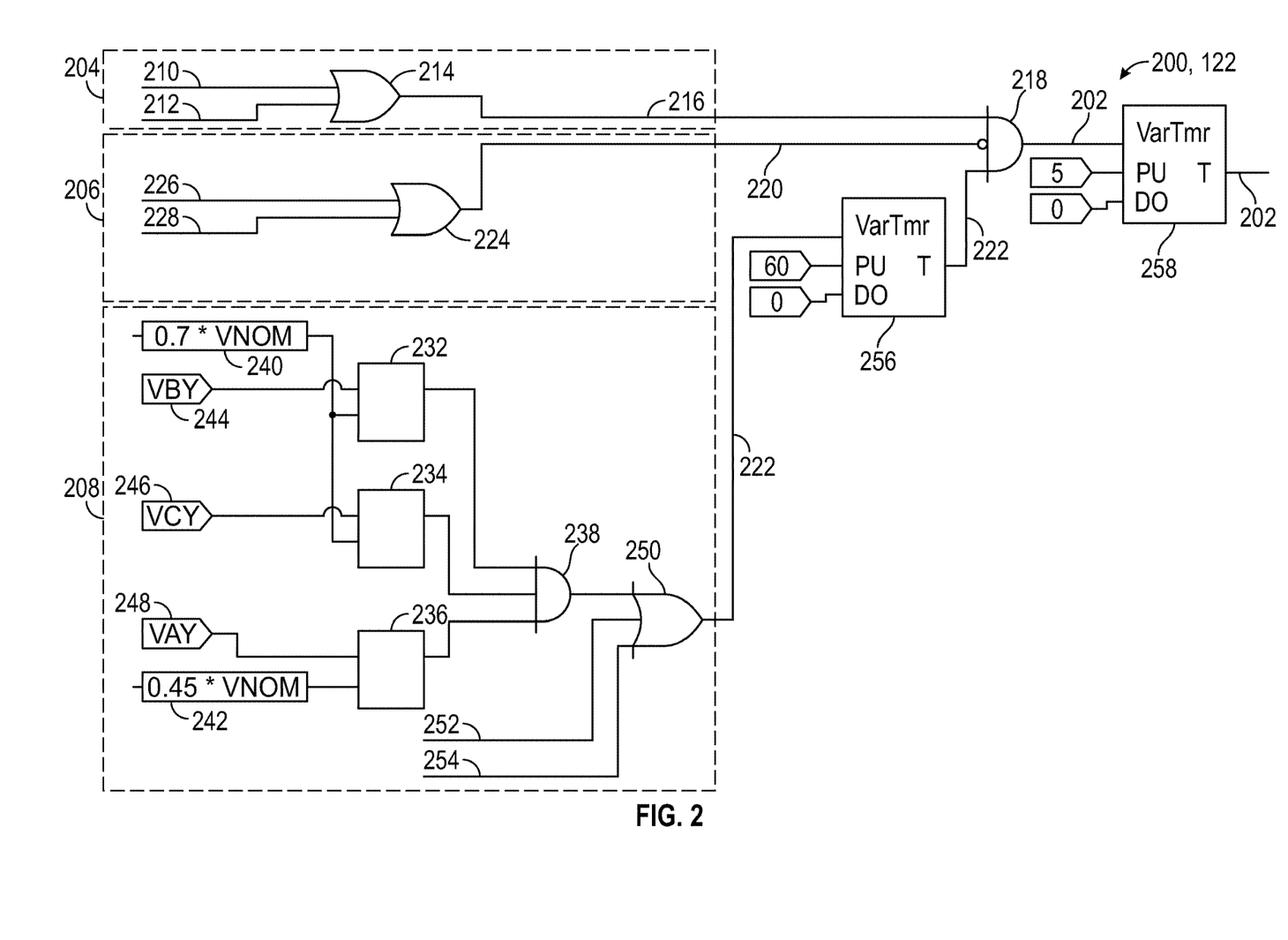
FIG. 2 depicts a schematic of the dependable open-phase detection logic including unbalance voltage detection logic, in accordance with an embodiment.

With the foregoing in mind, FIG. 2 depicts a schematic of a control logic 200 for detecting an open-phase condition on the distribution line 108. In some cases, the IED 122 (e.g., the processor 128 of the IED 122) may include the control logic 200. Alternatively or additionally, the PCC controllers of the first recloser 114, the second recloser 116, and/or the breaker 138 may include the control logic 200 to detect the open-phase condition. Moreover, in specific cases, a software (or firmware) may include instructions to carry out the functions performed by the control logic 200 or implement the schematic of the control logic 200. For example, the processor 128 of the IED 122 may receive such instructions and perform the functions associated with the schematic of the control logic 200 described below. In any case, the control logic 200 may provide one or more control signals (e.g., a break command) to the first recloser 114, the second recloser 116, and/or the breaker 138 to open (or close) the connection between the IBR 104 and the load 106.

In the depicted embodiment, the control logic 200 may provide a first break command 202 when detecting the open-phase condition. The control logic 200 may detect the open-phase condition by monitoring the one or more current factors and/or voltage factors on the distribution line 108 (shown in FIG. 1) based on using the capacitive low-energy analog voltage sensor 130 and the current transformer 134 on one side and the potential transformer 132 on another side of the first recloser 114. In different embodiments, the control logic 200 may detect the open-phase condition by monitoring the one or more current factors and/or voltage factors on either side of the distribution line 108 (e.g., the utility side or the IBR side). In particular, the control logic 200 may detect the open-phase condition by dependably using an unbalance voltage detection logic 204, a current detection logic 206, and a voltage detection logic 208, as will be appreciated.

The unbalance voltage detection logic 204 may determine the open-phase condition based on receiving an unbalanced zero-sequence voltage signal 210 or an unbalanced negative-sequence voltage signal 212. The unbalanced zero-sequence voltage signal 210 may indicate a high or low voltage on one of the three phases on the distribution line 108. Moreover, the unbalanced negative-sequence voltage signal 212 may indicate an unbalanced voltage. In some cases, the unbalanced negative-sequence voltage signal 212 may indicate an unbalanced negative-sequence voltage faster or more precisely when the IBR 104 is providing the electric power. In some cases, the IED 122 may provide the unbalanced zero-sequence voltage signal 210 and/or the unbalanced negative-sequence voltage signal 212 based on receiving an indication of the phase voltages of the distribution line 108.

For example, the IED 122 may determine the high unbalanced zero-sequence signal and/or an unbalanced negative-sequence voltage on the distribution line 108 when the transformer of the second recloser 116 and/or the substation malfunctions (e.g., one of three phases become open). Moreover, in some cases, the high voltage may correspond to a phase voltage with a higher voltage using different voltage factors compared to a nominal voltage or compared to a voltage of the other phases. For example, the high voltage may correspond to voltages higher than 1.1, 1.2, or 1.3 of a nominal voltage unit, among other possibilities. The nominal voltage may correspond to a nominal operating voltage of the electric power delivery system 100 provided by the IBR 104. In some cases, an operator may select the nominal voltage of the IBR 104.

The unbalance voltage detection logic 204 may include an OR gate 214 receiving the unbalanced zero-sequence voltage signal 210 and/or the unbalanced negative-sequence voltage signal 212. The OR gate 214 may provide a high voltage unbalance signal 216 in response to receiving a high unbalanced zero-sequence voltage signal 210 and/or a high unbalanced negative-sequence voltage signal 212. In particular, the OR gate 214 may provide the high voltage unbalance signal 216 to an AND gate 218, coupled thereto, for providing the first break command 202. As such, the OR gate 214 may detect and provide an indication of unbalanced voltage (e.g., unbalanced zero-sequence voltage and/or unbalanced negative-sequence voltage) on the distribution line 108.

The AND gate 218 may also receive a current detection signal 220 and a phase voltage detection signal 222 to secure the voltage unbalance signal 216. The control logic 200 may use the current detection logic 206 to provide the current detection signal 220 and the voltage detection logic 208 to provide the phase voltage detection signal 222. The control logic 200 may use the phase voltage detection signal 222 and the inversion of the current detection signal 220 to secure the voltage unbalance signal 216 during system transients.

For example, the electric power delivery system 100 may experience transients during switching events, among other possibilities. Accordingly, in the depicted embodiment, the AND gate 218 may provide the first break command 202 based on receiving a high voltage unbalance signal 216, a current detection signal 220 (e.g., the inverted current detection signal 220), and the phase voltage detection signal 222. That said, in a different embodiment, the electric power delivery system 100 may use other circuit components and signal configurations.

The current detection logic 206 may include an OR gate 224 coupled to the inverting input of the AND gate 218. The OR gate 224 may receive a phase current detection signal 226 and a ground current indication signal 228. The phase current detection signal 226 may indicate whether the IBR 104 is supplying power to the load 106. For example, the IED 122 may use phase current detection signal 226 to determine when transformer 112 is unloaded. The IED 122 may provide the load detection signal 226 when a phase current of the distribution line 108 is above a current threshold (e.g., a minimum phase current threshold for load detection, 0.1 Amperes (A), 0.2 A, 0.3 A, or 0.5 A, among other current thresholds). In some cases, an operator may select the current threshold.

The ground current indication signal 228 may indicate whether ground current of the distribution line 108 is above a ground current threshold (e.g., a minimum ground current threshold for detection, 0.1 A, 0.2 A, among other current thresholds). For example, the IED 122 may provide a high ground current indication signal 228 when the ground current is equal to or above the ground current threshold. In some cases, the operator may select the ground current threshold. Accordingly, the OR gate 224 may provide a current detection signal 220 when load current 226 is above the phase current threshold or ground current 228 is above the ground current threshold. The OR gate 224 may provide the current detection signal 220 to the inverting input of the AND gate 218 (e.g., due to an inverting input of the AND gate 218) to indicate that IBR 104 is not supplying power to the load 106 and as such, the transformer 112 is unloaded.

The voltage detection logic 208 may determine whether a voltage level of each of the three phases is above a voltage threshold. Accordingly, the voltage detection logic 208 may determine whether a voltage is present on all three phases during an open-phase condition. For example, the voltage detection logic 208 may determine whether each of the three phases have a sufficiently high voltage with respect to the nominal voltage. The voltage detection logic 208 may determine whether a voltage is present on the distribution line 108 based on using the voltage detection logic 208. The voltage detection logic 208 may secure the voltage unbalance signal 316 by providing the voltage detection signal 222. Accordingly, the control logic 200 may determine whether a voltage is present on the distribution line 108 before determining an unbalanced voltage between the three phases using the AND gate 218.

The voltage detection logic 208 may include comparators 232, 234, and 236 coupled to an AND gate 238. When one of the three phases on the distribution line 108 is opened, the IBR 104 may produce some voltage on the opened phase. For example, the IBR 104 may provide the operating voltage based on the nominal voltage of the IBR 104.

With the foregoing in mind, the comparators 232 and 234 may receive a first reference voltage 240 and the comparator 236 may receive a second reference voltage 242. In the depicted embodiment, the first reference voltage 240 may have a low voltage threshold for operating phases based on the nominal voltage. For example, the first reference voltage 240 may correspond to 70% of the nominal voltage of the IBR 104.

Moreover, the second reference voltage 242 may have a lower voltage threshold with respect to the first reference voltage 240 to allow for open phase detection, for example, when the IBR 104 provides the voltage or when voltage is regenerated due to the construction of the transformer 112. For example, the second reference voltage 242 may correspond to 45% of the nominal voltage of the IBR 104. Accordingly, the voltage detection logic 208 may determine whether a voltage level of each of the three phases is above the respective voltage thresholds. For example, the voltage detection logic 208 may indicate whether there is no loss of voltage signal condition or a power system disturbance that drives an assertion of the unbalanced voltage detection 216. As such, the voltage detection logic 208 may also secure the voltage unbalance signal 216 using the voltage detection signal 222. That said, in different cases, the comparators 232, 234, and 236 may use different voltage thresholds.

In any case, the comparators 232, 234, and 236 may receive a first voltage 244, a second voltage 246, and a third voltage 248 of a first, a second, and a third phase of the electric power on the distribution line 108 respectively. The comparators 232 and 234 may compare the received first and second voltages 244 and 246 with a received voltage threshold based on receiving the first reference voltage 240 (e.g., 0.7 of the nominal voltage). Moreover, the comparator 236 may compare the received third voltage 248 with the received voltage threshold based on receiving the second reference voltage 242 (e.g., 0.45 of the nominal voltage).

The comparators 232, 234, and 236 may determine whether the voltage level of each of the three phases is higher than the respective voltage thresholds. When the voltage level of each of the three phases is higher than the respective voltage thresholds, the AND gate 238 may provide a high signal to an OR gate 250. Subsequently, the OR gate 250 may provide the phase voltage detection signal 222 indicative of the sufficient voltage to the AND gate 218. Accordingly, in the depicted circuit, the voltage detection logic 208 may determine whether the voltage is present on all three phases.

The voltage detection logic 208 may also include additional circuitry, circuitry 252 and 254, to account for two additional possible variations of comparing the measured three phases against the first reference voltage 240 and the second reference voltage 242. For example, the circuitry 252 may determine whether a second voltage 246 and a third voltage 248 are greater than the first reference voltage 240, and a first voltage 244 is greater the second reference voltage 242. Moreover, the circuitry 254 may determine whether a first voltage 244 and a third voltage 248 are greater than the first reference voltage 240, and a second voltage 246 is greater the second reference voltage 242.

In some embodiments, the logic 252 and 254 may include similar circuit components as the depicted portion of the voltage detection logic 208. In any case, the OR gate 250 may provide the phase voltage detection signal 222 in response to receiving a high input. That is, the phase voltage detection signal 222 may indicate that there is no loss of voltage signal, and that some voltage is present on all three phases on the distribution line 108.

In some embodiments, the AND gate 218 may receive the high voltage detection signal 222 via a timer 256. The timer 256 may provide the high voltage detection signal 222 in response to receiving the high voltage detection signal 222 for at least a threshold amount of time. The timer 256 may prevent some transients, such as a transformer inrush condition, from causing the control logic 200 to detect an open-phase condition. For example, the timer 256 may permit detection of an open-phase condition by determining that the system is energized for at least the threshold amount of time. In different cases, the threshold amount of time may be 0.01 Seconds (S), 0.1 S, 0.15 A, 0.5 S, 1 S, 10 S, etc. Moreover, in some cases, an operator may select the threshold amount of time.

With the foregoing in mind, the AND gate 218 may provide a high first break command 202 when detecting the open-phase condition on one phase when the IBR 104 is providing the electric power. In particular, the AND gate 218 may dependably use the unbalance voltage detection logic 204, the current detection logic 206, and the voltage detection logic 208 to provide the high first break command 202. For example, the processor 128 of the IED 122 may receive the high first break command 202 indicative of the open-phase condition.

In some embodiment, the control logic 200 may also include a timer 258. The timer 258 may prevent a misoperation during some transients when providing the first break command 202. For example, the timer 256 may provide the high first break command 202 to the processor 128 of the IED 122 in response to receiving the high first break command 202 for at least a threshold amount of time. In different cases, the threshold amount of time of the timer 258 may be different (e.g., 0.01 s, 0.015 s, 0.02 s, 0.1 s, 0.5 s, etc.). Moreover, in some cases, an operator may select the threshold amount of time (e.g., pre-defined threshold amount of time).

Figure 3:
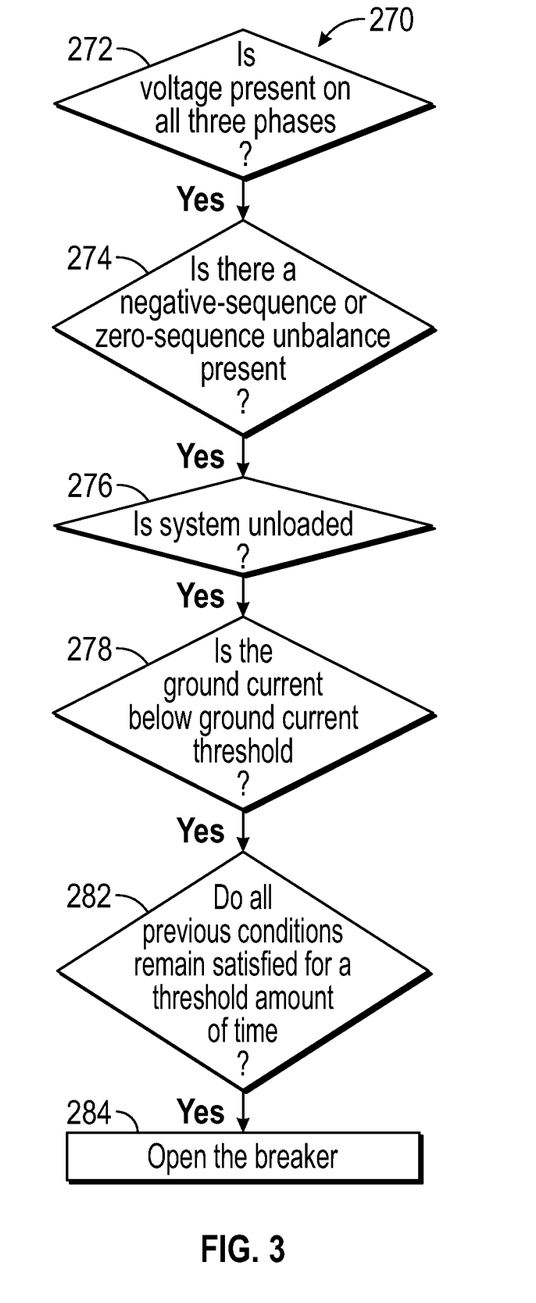
FIG. 3 depicts a method of determining the open-phase condition using the logic of FIG. 2, in accordance with an embodiment.

FIG. 3 depicts a method 270 associated with the IED 122. The IED 122 may determine an open-phase condition to open a breaker (e.g., the first recloser 114, the second recloser 116, the breaker 138, etc.) using the method 270. The method 270 may be carried out by a circuit (e.g., the control logic 200), a software, a firmware, or a combination thereof. Although the method 270 is described in a particular order, it should be appreciated that the IED 122 may perform the operations in any viable order. Moreover, although the method 270 includes specific operations of the IED 122, the IED 122 may also perform other operations not mentioned in the method 270 of FIG. 3.

At block 272, the IED 122 may determine whether voltage is present on all three phases. At block 274, the IED 122 may determine whether a negative-sequence or a zero-sequence voltage unbalance is present. That said, in alternative or additional cases, the IED 122 may determine whether voltage of the three phases is unbalanced using zero-sequence voltage and/or a negative-sequence voltage measurements.

In some cases, the IED 122 may use the unbalance voltage detection logic to perform the operations of the blocks 272 and 274. Moreover, in some cases, the IED 122 may proceed to block 276 in response to determining either the voltage of one of the phases at block 272 or an unbalanced negative-sequence voltage of the three phases at block 274. For example, the IED 122 may use the OR gate 214 to determine an unbalance between the three phases.

The current detecting logic 206 may perform the operations of the blocks 276, 278, and 280. For example, the current detecting logic 206 may use the OR gate 224 to provide the current detection signal 220 in response to the operations of the blocks 276, 278, and 280. At block 276, the IED 122 may determine whether the system is unloaded. For example, the IED 122 may determine whether the system is unloaded based on determining that phase current is measurable. Moreover, at block 278, the IED 122 may determine whether the ground current is below the ground current threshold.

At block 282, IED 122 may determine whether all the previous conditions remain satisfied for a threshold amount of time. Subsequently, at block 284, the IED 122 may open the breaker in response to detecting a voltage unbalance when voltage is present on all three phases and different currents measurements are below their respective thresholds. Accordingly, at block 284, the IED 122 may open the breaker based on receiving the break command 202 from the IED 122. The IED 122 may open the breaker based on determining the open-phase condition by performing the above functions.

Figure 4:
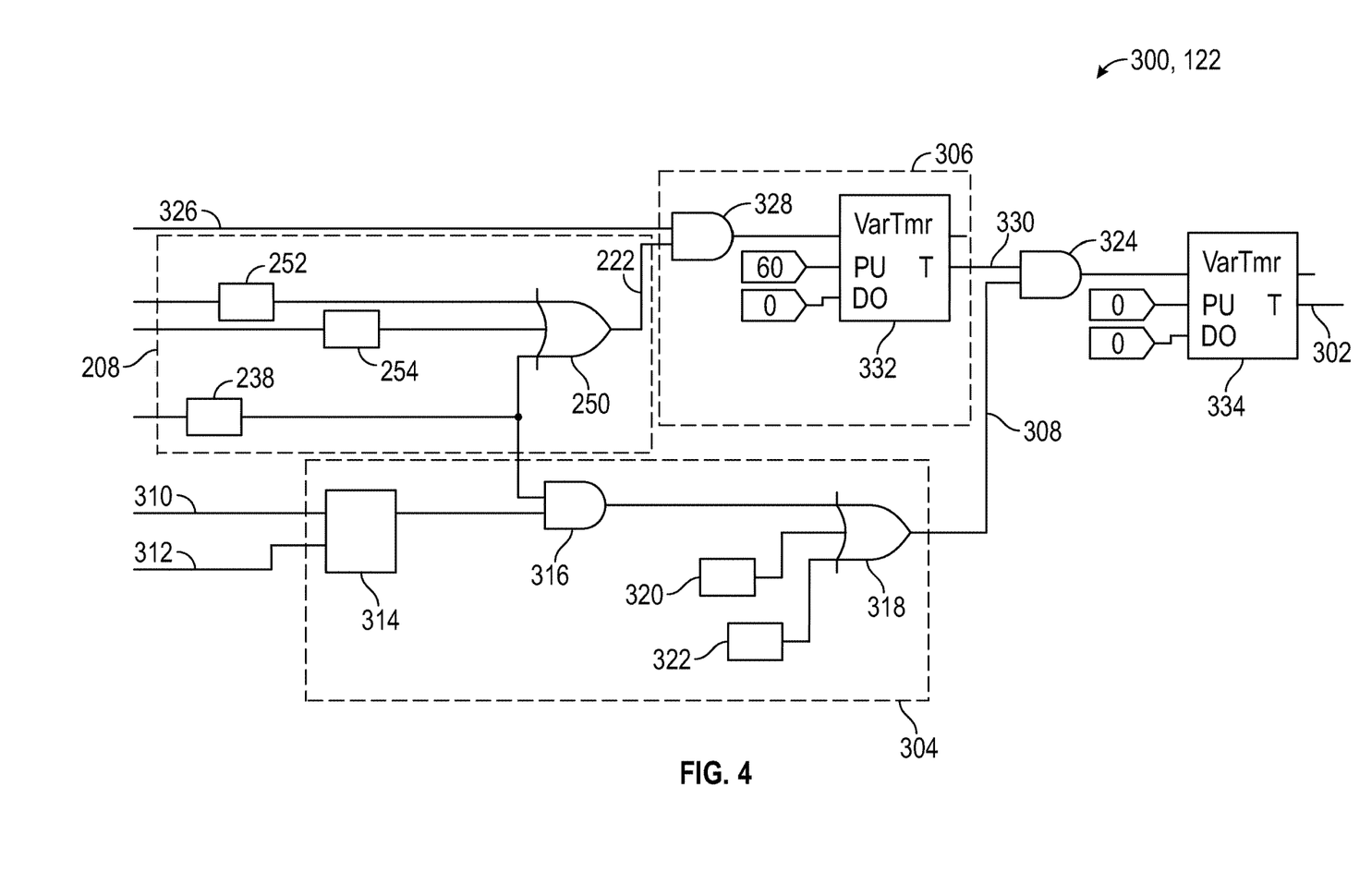
FIG. 4 depicts a schematic of the dependable open-phase detection logic including total voltage harmonic distortion detection circuitry, in accordance with an embodiment.

FIG. 4 depicts a schematic of a control logic 300 for detecting an open-phase condition of the three phase voltage on the distribution line 108. Similar to the control logic 200 discussed above, in some cases, the IED 122 (e.g., the processor 128 of the IED 122) may include the control logic 300. Moreover, in specific cases, a software (or firmware) may include instructions to carry out the functions performed by the control logic 300 or implement the schematic of the control logic 300. For example, the processor 128 of the IED 122 may receive such instructions and perform the functions associated with the schematic of the control logic 300 described below. Alternatively or additionally, the PCC controllers of the first recloser 114, the second recloser 116, and/or the breaker 138 may include the control logic 300 to detect the open-phase condition. In any case, the control logic 300 may provide one or more control signals (e.g., a break command) to the first recloser 114, the second recloser 116, and/or the breaker 138 to open (or close) the connection between the IBR 104 and the load 106.

In the depicted embodiment, the control logic 300 may provide a second break command 302 when detecting the open-phase condition. The control logic 300 may detect the open-phase condition by monitoring the one or more current factors and/or voltage factors on the distribution line 108 (shown in FIG. 1) based on using the capacitive low-energy analog voltage sensor 130 and the current transformer 134 on one side and the potential transformer 132 on another side of the first recloser 114. In different embodiments, the control logic 300 may detect the open-phase condition by monitoring the one or more current factors and/or voltage factors on either side of the first recloser 114 (e.g., the utility side or the IBR side). In particular, the control logic 300 may detect the open-phase condition dependably by using a waveform distortion detection logic 304 and a transformer energized logic 306 (e.g., an online and healthy voltage measurement logic), as will be appreciated.

The waveform distortion detection logic 304 may determine whether a total harmonic distortion of the waveforms of each of the three phases is increased above a deviation threshold. For example, the waveform distortion detection logic 304 may provide high distortion detection signal 308 in response to determining an increase of the distortion of the waveform of any of the three phases above the deviation threshold. In different embodiment, the deviation threshold may include a 1%, 1.5%, 4% deviation from the nominal total harmonic distortion of the electric power delivery system 100. Moreover, in some cases, an operator may select the deviation threshold.

In the depicted embodiment, the waveform distortion detection logic 304 may receive a voltage total harmonic distortion signal 310 and a deviation threshold signal 312. The voltage total harmonic distortion signal 310 may provide an indication of the deviation of the first phase of the three phases from a nominal harmonic distortion (e.g., with zero or near zero distortion). A comparator 314 may receive the voltage total harmonic distortion signal 310 and the deviation threshold signal 312. As such, the comparator 314 may determine whether the deviation of the first phase from the nominal harmonic distortion is above the deviation threshold. When the deviation of the first phase is above the deviation threshold, the first phase may be open (e.g., experiencing an open-phase condition).

The comparator 314 may provide a high signal to an AND gate 316 coupled thereto when the deviation of the first phase is above the deviation threshold. The AND gate 316 may also receive a signal from the AND gate 238 of the voltage detection logic 208 indicative of whether a sufficient voltage is present on all three phases. In some embodiments, the control logic 300 may include the voltage detection logic 208 described above with respect to FIG. 2. Accordingly, the AND gate 316 may provide a high signal when deviation of the first phase is above the deviation threshold and sufficient voltage is present on three phases (e.g., the IBR 104 is not offline/idle or the transformer 112 did not regenerate voltage on the open phase).

An OR gate 318 may provide the high distortion detection signal 308 in response to receiving the high signal from the AND gate 316. Moreover, the OR gate 318 may receive additional signals from logic 320 and 322. In some cases, the logic 320 and 322 may include additional logic similar to the depicted portion of the waveform distortion detection logic 304.

The logic 320 may provide a high signal when deviation of the second phase is above the deviation threshold and a voltage (e.g., minimum voltage) is present on all phases (e.g., the IBR 104 is not off/idle or the transformer 112 did not regenerate voltage on the open phase). Moreover, the logic 322 may provide a high signal when deviation of the third phase is above the deviation threshold and a voltage is present on all phases. The logic 320 and 322 may also use different portions of the voltage detection logic 208 for providing the high signals.

As such, the OR gate 318 may provide the high distortion detection signal 308 when deviation of any of the phases is above the deviation threshold and the IBR 104 is not offline. The waveform distortion detection logic 304 may provide the high distortion detection signal 308 to an AND gate 324. The AND gate 324 may also receive a transformer energized logic signal 306.

In the depicted embodiment, the transformer energized logic 306 may determine whether the breaker is closed and when voltage is present on all phases. The transformer energized logic 306 may receive a breaker status signal 326 and the voltage detection signal 222. The voltage detection logic 208 may provide a voltage detection signal 222 when voltage (e.g., a minimum voltage) is present on all three phases.

The breaker status signal 326 may indicate whether a breaker (e.g., three phase breaker, the first recloser 114) associated with the IED 122 is open or close. In any case, an AND gate 328 of the transformer energized logic 306 may receive the breaker status signal 326 and the output of the voltage detection signal 222. Subsequently, the AND gate 328 may provide a high breaker closed signal 330 in response to receiving a high breaker status signal 326 and a high voltage detection signal 222.

The high breaker closed signal 330 may indicate that the breaker is closed (not open) and voltage is present on all three phases (the transformer 112 is energized). The transformer energized logic 306 may also include a timer 332. The timer 332 may receive and provide the transformer energized signal 330 when receiving the high transformer energized signal 330 for at least a threshold amount of time. An operator may select the threshold amount of time. For example, the threshold amount of time may be 0.05 S, 0.1 S, and 0.5 S, among other times. The timer 332 may prevent some transients from causing mis-operations based on setting the threshold amount of time.

In any case, the AND gate 324 may provide the second break command 302 in response to receiving the high breaker closed signal 330 and the high distortion detection signal 308. The control logic 300 may also include a timer 334, similar or different from the timer 332. The timer 334 may also prevent some transients based on a respective threshold amount of time. The IED 122 may open the first recloser 114, or a different breaker, in response to receiving the first break command 202, the second break command 302, or both.

Figure 5:
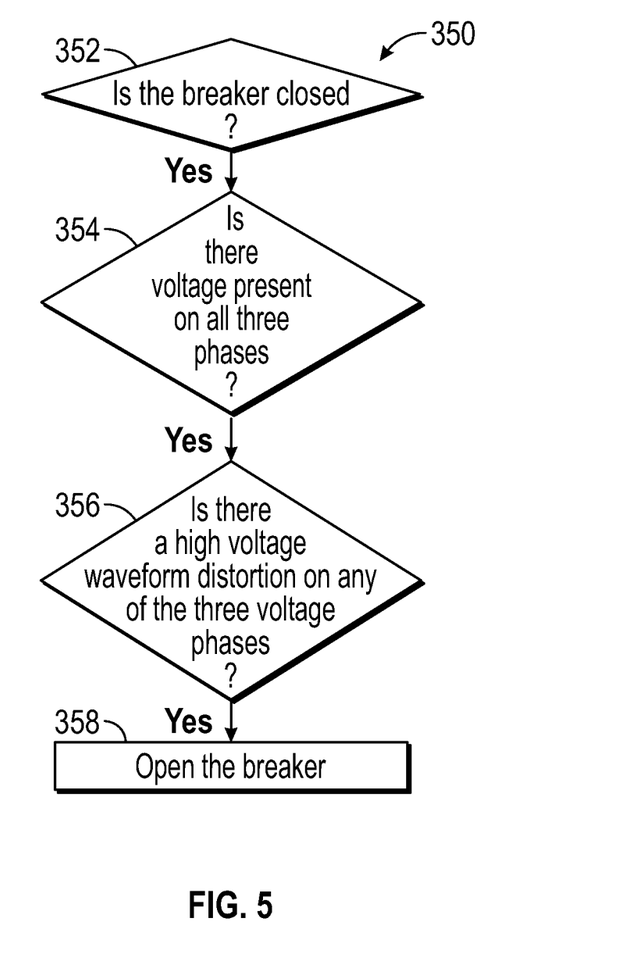
FIG. 5 depicts a method of determining the open-phase condition using the control logic of FIG. 4, in accordance with an embodiment.

FIG. 5 depicts a method 350 of determining an open-phase condition. The IED 122 may use the method 350 to open a breaker (e.g., the first recloser 114, the second recloser 116, the PCC breaker 138, etc.) based on determining the open-phase condition on at least one phase between, for example, the utility source 105 and the IBR 104. Moreover, the method 350 may be carried out by logic in (e.g., the logic 300), a software, a firmware, or a combination thereof. Although the method 350 is described in a particular order, it should be appreciated that the IED 122 may perform the operations in any viable order. Moreover, although the method 350 includes specific operations of the IED 122, the IED 122 may also perform other operations not mentioned in the method 350 of FIG. 5. In some cases, the IED 122 may use the control logic 300 of FIG. 4 to perform the method 350.

At block 352, the IED 122 may determine whether the breaker (e.g., the first recloser 114, the second recloser 116, and/or the PCC breaker 138) is closed. As mentioned above, the control logic 300 may receive the breaker status signal 326 to determine whether the breaker is closed. For example, the processor 128 of the IED 122 may determine and provide the breaker status signal 326.

At block 354, the IED 122 may determine whether voltage is present on all three phases. For example, the control logic 300 may use the voltage detection logic 208 to determine whether sufficient voltage is present.

At block 356, the IED 122 may determine whether a voltage distortion, higher than a threshold, is present on any of the three phases. As discussed above, the control logic 304 may be used to determine whether a voltage distortion is present on any of the three phases. In some cases, the processor 128 may provide the voltage total harmonic distortion signal 310 and the deviation threshold signal 312 to the transformer energized logic 306.

At block 358, the IED 122 may open the breaker in response to determining the above discussed blocks. The control logic 300 may provide the second break command 302 for opening the breaker based on determining the open-phase condition based on performing the above functions.

Figure 6:
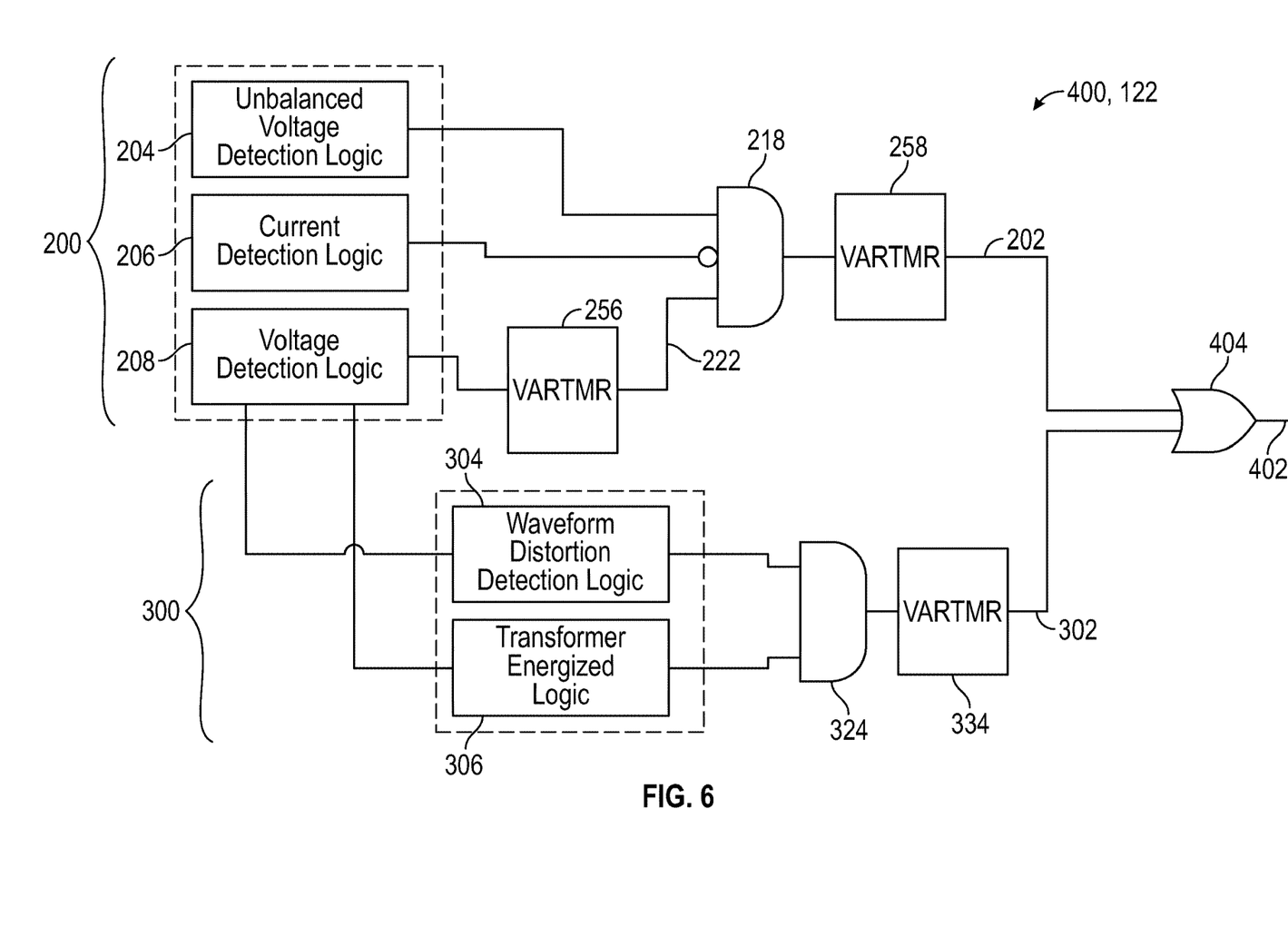
FIG. 6 depicts a schematic of the dependable open-phase detection logic including the unbalance voltage detection logic and the total voltage harmonic distortion detection logic, in accordance with an embodiment.

FIG. 6 depicts a schematic of a dependable open-phase detection logic 400 including the control logics 200 and 300. The dependable open-phase detection circuit 400 may use the unbalance voltage detection logic 204 and the waveform distortion detection logic 304. Accordingly, the dependable open-phase detection circuit 400 may transmit a third break command 402 in response to receiving the first break command 202 or the second break command 302.

For example, the dependable open-phase detection circuit 400 may include the unbalance voltage detection logic 204, the current detection logic 206, and the voltage detection logic 208 of the control logic 200. Moreover, the dependable open-phase detection logic 400 may also include the timer 254, the AND gate 218, and the timer 256 to provide the first break command 202.

Additionally, the dependable open-phase detection logic 400 may include the waveform distortion detection logic 304 and the transformer energized logic 306 of the control logic 300. Furthermore, the dependable open-phase detection logic 400 may also include the AND gate 324 and the timer 334 to provide the second break command 302. The dependable open-phase detection circuit 400 may include an OR gate 404 to provide the third break command 402 in response to receiving the first break command 202, the second break command 302, or both.

Accordingly, the dependable open-phase detection circuit 400 may provide the third break command 402 based at least in part on determining an unbalanced voltage or a voltage waveform distortion (e.g., total harmonic distortion) on the three phases. That said, it should be appreciated the unbalance voltage detection logic 204, the current detection logic 206, the voltage detection logic 208, the waveform distortion detection logic 304, and the transformer energized logic 306 may each include hard logic circuitry, programmable logic circuitry, software programmable circuitry, or any other viable form of circuitry to perform the above described functions.

In alternative or additional cases, the dependable open-phase detection logic 400 may include additional open-phase detection control circuits coupled to the OR gate 404. For example, the dependable open-phase detection logic 400 may also include an additional control scheme based on at least one revision of IEEE 1547 standards to determine the open-phase condition. Accordingly, the IED 122 may determine the open-phase condition based on receiving the third break command 402 in response to receiving the first break command 202, the second break command 302, or a break command from the control scheme that is based on the IEEE 1547 standard.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Moreover, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electric power delivery system, comprising:
an inverter based resource configured to provide three phased electric power to one or more loads;
a breaker configured to selectively open a connection between the inverter based resource and the one or more loads;
a first control circuit comprising:
an unbalance voltage detection circuit configured to provide a voltage unbalance signal in response to receiving an unbalanced phase voltage signal or an unbalanced three-phase voltage sequence signal;
a current detection circuit configured to provide a current detection signal in response to detecting a load, a low ground current and a phase current below a threshold; and
a voltage detection circuit configured to provide a voltage detection signal in response to detecting a voltage higher than a threshold on all three phases of the three phased electric power;
wherein the first control circuit is configured to provide a first break command in response to the voltage unbalance signal, the current detection signal, and the voltage detection signal; and
a second control circuit comprising a waveform distortion detection circuit, wherein the waveform distortion detection circuit is configured to provide a distortion detection signal in response to determining a distortion in a voltage waveform of the three phased electric power, wherein the second control circuit is configured to provide a second break command in response to the distortion detection signal;
wherein the breaker is configured to be opened in response to the first break command, the second break command, or both.

2. The electric power delivery system of claim 1, comprising a controller associated with the breaker, wherein the controller comprises the first controller circuit and the second controller circuit.

3. The electric power delivery system of claim 2, wherein the controller is configured to transmit the break command to open the breaker in response to determining an open-phase condition based on the first break command, the second break command, or both.

4. The electric power delivery system of claim 1, wherein the unbalanced three-phase voltage sequence signal comprises an unbalanced negative-sequence voltage signal, or an unbalanced zero-sequence voltage signal.

5. The electric power delivery system of claim 1, wherein the electric power delivery system comprises one or more sensors.

6. The electric power delivery system of claim 5, wherein the unbalance voltage detection circuit is configured to receive the unbalanced phase voltage signal from a processing circuit of the electric power delivery system based on receiving an indication of the phase voltages from the one or more sensors.

7. The electric power delivery system of claim 5, wherein the waveform distortion detection circuit is configured to determine a distortion in the voltage waveform to provide the distortion detection signal based on comparing a received indication of a total harmonic distortion from the one or more sensors and a received distortion deviation threshold.

8. The electric power delivery system of claim 1, comprising a processing circuit, wherein the processing circuit is configured to provide the phase voltage signal based on determining that at least one of the phase voltages is unbalanced compared to the other two phases and provide the unbalanced three-phase voltage sequence signal based on determining that a voltage sequence of the phase voltages is unbalanced.

9. The electric power delivery system of claim 1, wherein the current detection circuit is configured to:
  detect a low ground current based on receiving a ground current indication signal indicative of a ground current below a first current threshold; and
  detect a phase current below a threshold based on receiving a phase overcurrent detection signal indicative of a phase current below a second current threshold.

10. The electric power delivery system of claim 1, wherein the second control circuit comprises a supervisory circuit that indicates that the system is online and the voltage measurements are healthy, wherein the breaker status circuit is configured to provide a breaker closed signal in response to determining that the breaker is closed, wherein the second control circuit is configured to provide the second break command in response to the distortion detection signal and the breaker closed signal.

11. A controller device, comprising:
  an unbalance voltage detection circuit, wherein the unbalance voltage detection circuit is configured to provide a voltage unbalance signal in response to receiving an indication of an unbalanced phase voltage or an unbalanced three-phase voltage sequence of a three phased electric power provided on a distribution line of an electric power delivery system;
  a current detection circuit, wherein the current detection circuit is configured to provide a current detection signal in response to detecting a low phase current of the distribution line and detecting a low ground current of the distribution line; and
  a voltage detection circuit, wherein the voltage detection circuit is configured to provide a voltage detection signal in response to detecting a voltage higher than a threshold on at least two of the three phased electric power on the transmission line;
  wherein the controller is configured to provide a break command signal indicative of an open-phase condition of at least one of the three phases of the three phased electric power on the distribution line in response to receiving the voltage unbalance signal, the current detection signal, and the voltage detection signal.

12. The controller device of claim 11, wherein the three phased electric power is provided by an inverter on the distribution line.

13. The controller device of claim 11, wherein the indication of an unbalanced phase voltage is received based on based on receiving an indication of an unbalanced negative-sequence voltage, or an unbalanced zero-sequence voltage.

14. The controller device of claim 11, wherein:
  detecting a low ground current comprises receiving a ground current indication signal indicative of a ground current below a first current threshold; and
  detecting the phase current below the threshold comprises receiving a phase overcurrent detection signal indicating that a current of the three phased electric power is below a second current threshold.

15. The controller device of claim 11, wherein the break command signal is configured to cause opening a connection of one or more loads of the electric power delivery system from an electric power source of the electric power delivery system.

16. The controller device of claim 11, comprising:
  a waveform distortion detection circuit, wherein the waveform distortion detection circuit is configured to provide a distortion detection signal in response to determining a distortion in a voltage waveform of the three phased electric power; and
  a supervisory circuit, wherein the supervisory circuit is configured to provide a breaker closed signal in response to determining that a breaker associated with the controller device on the transmission line is closed;
  wherein the controller device is configured to provide a break command signal indicative of an open-phase condition of at least one of the three phases of the three phased electric power on the transmission line in response to receiving:
    the voltage unbalance signal, the current detection signal, and the voltage detection signal; or
    the distortion detection signal and the breaker closed signal.

17. A non-transitory computer-readable medium comprising instructions, wherein the instructions, when executed by processing circuitry, are configured to cause the processing circuitry to perform operations comprising:
  determining a distortion in a voltage waveform of a three phased electric power provided by an inverter based resource on a transmission line of an electric power delivery system;
  providing a distortion detection signal in response to determining that the distortion in the voltage waveform of at least one of the three phased electric power is above a total harmonic waveform distortion threshold;
  determining whether a breaker on the distribution line is closed;
  providing a breaker closed signal in response to determining that the breaker on the transmission line is closed; and
  providing a break command signal indicative of an open-phase condition of the at least one of the three phases of the three phased electric power on the distribution line in response to the distortion detection signal and the breaker closed signal.

18. The non-transitory computer-readable medium of claim 17, wherein providing the break command signal opens a breaker of the electric power delivery system on the distribution line.

19. The non-transitory computer-readable medium of claim 18, wherein the breaker opens a connection between the inverter based resource and one or more loads based on the open-phase condition.

20. The non-transitory computer-readable medium of claim 17, comprising:
- determining whether an operating voltage of at least one of the three phases of the three phased electric power is above a voltage threshold;
- providing an indication of a high operating voltage in response to determining that the operating voltage of at least one of the three phases of the three phased electric power is above the voltage threshold;
- determining whether the three phased electric power comprises an unbalanced three-phase voltage sequence, wherein the unbalanced three-phase voltage sequence comprises an unbalanced negative-sequence voltage or an unbalanced zero-sequence voltage;
- providing an indication of an unbalanced phase voltage in response to determining that the three phased electric power comprises the unbalanced three-phase voltage sequence; and
- providing the break command signal to open a breaker of the electric power delivery system on the transmission line in response to the indication of the high operating voltage and the unbalanced phase voltage.

* * * * *